UNITED STATES PATENT OFFICE.

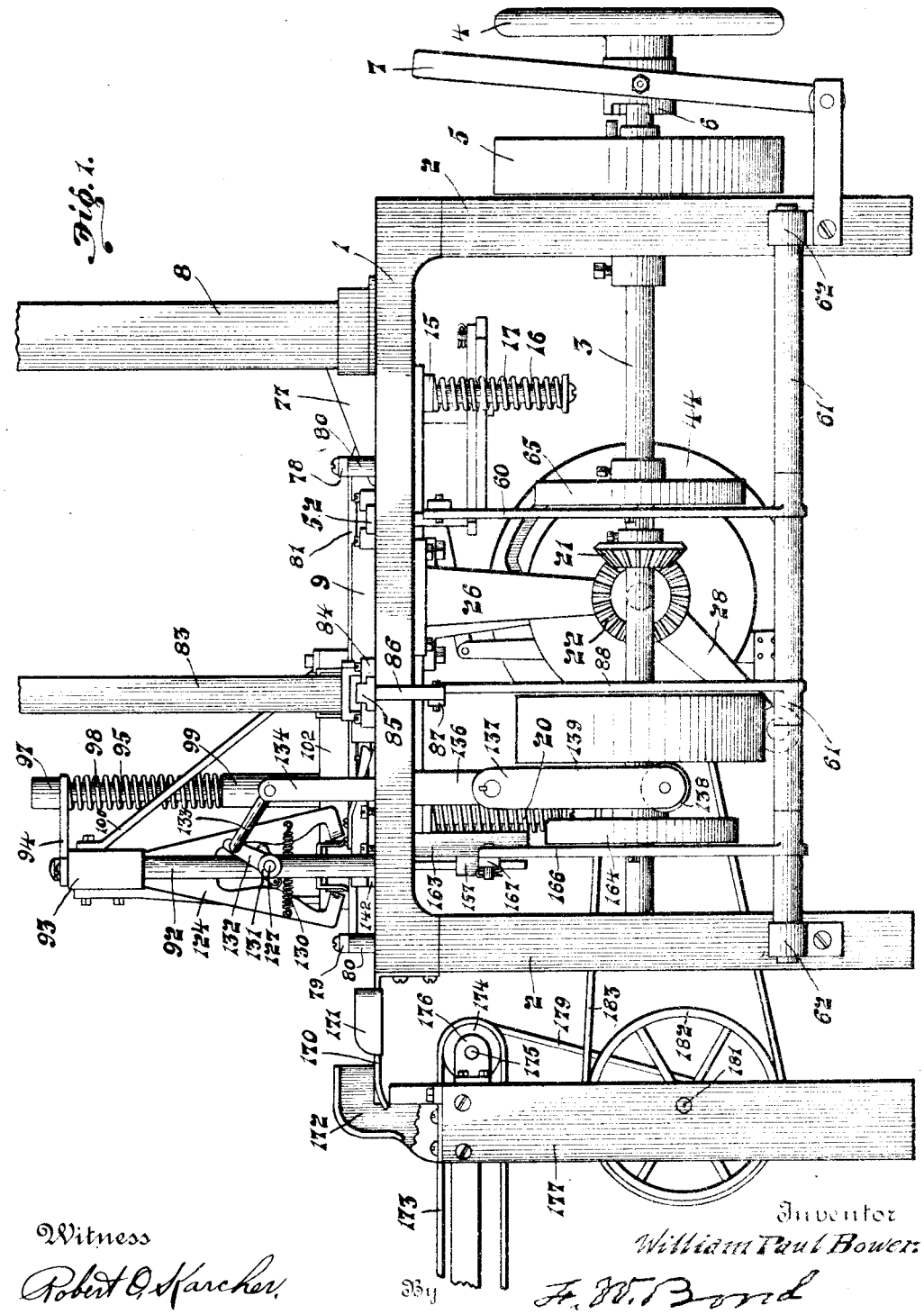

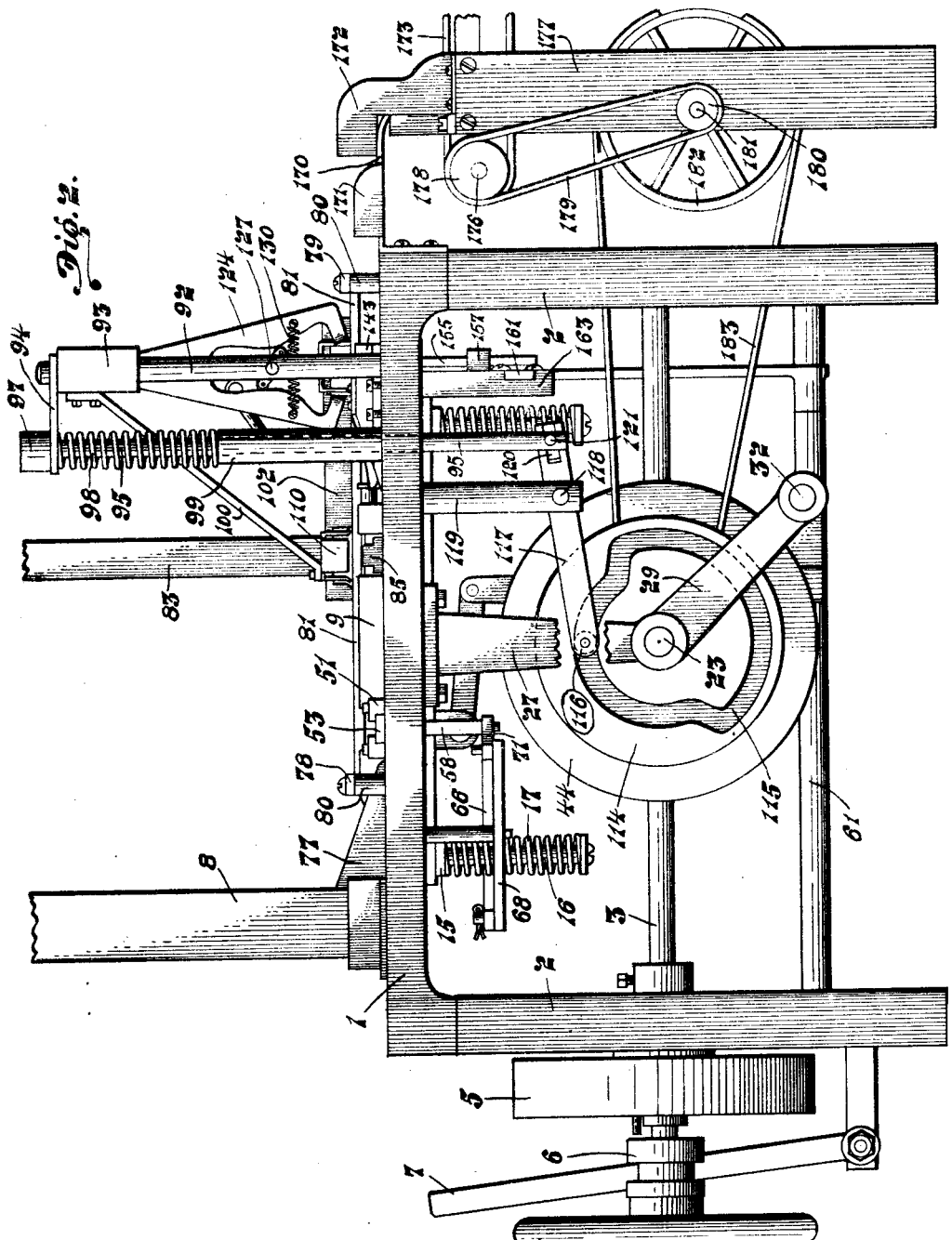

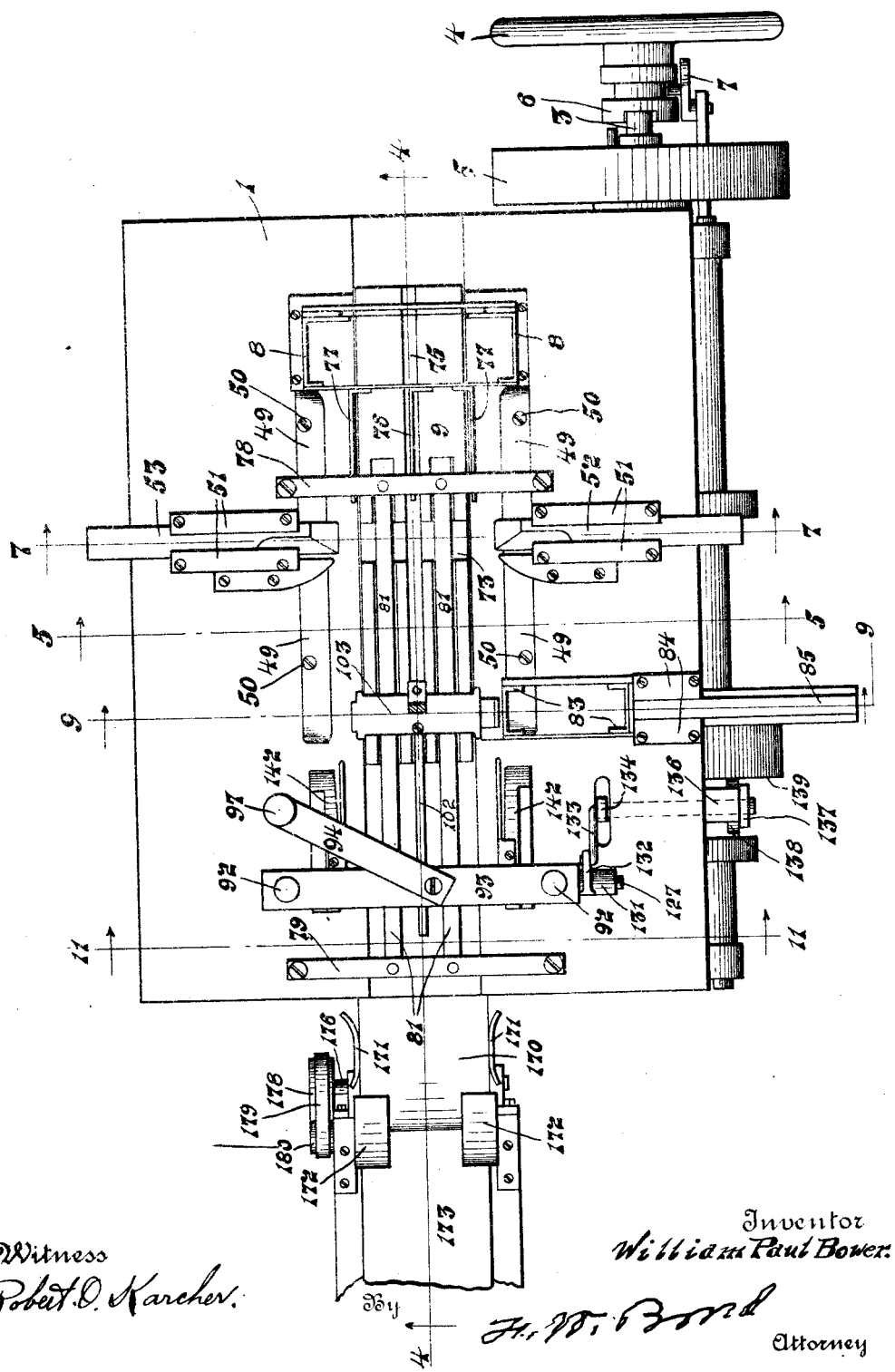

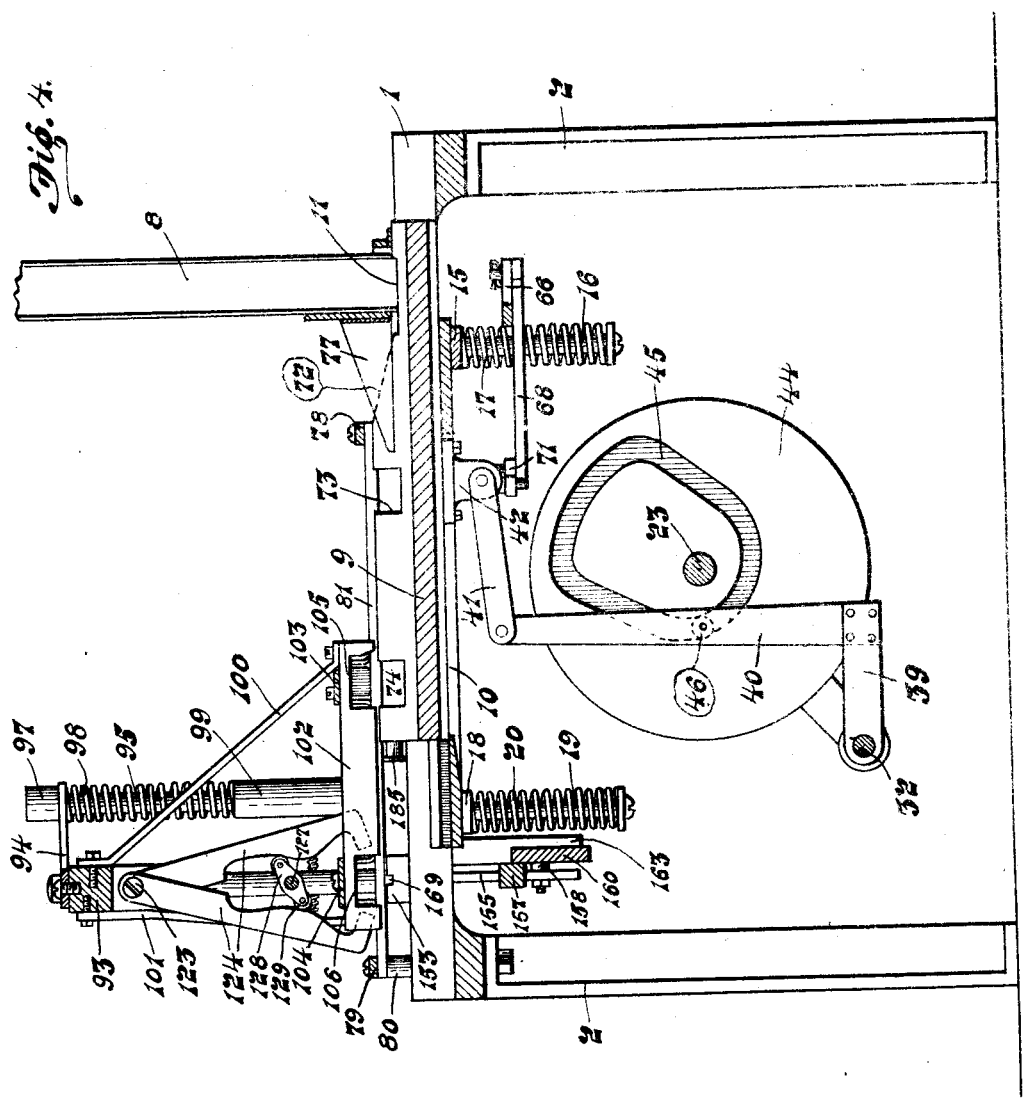

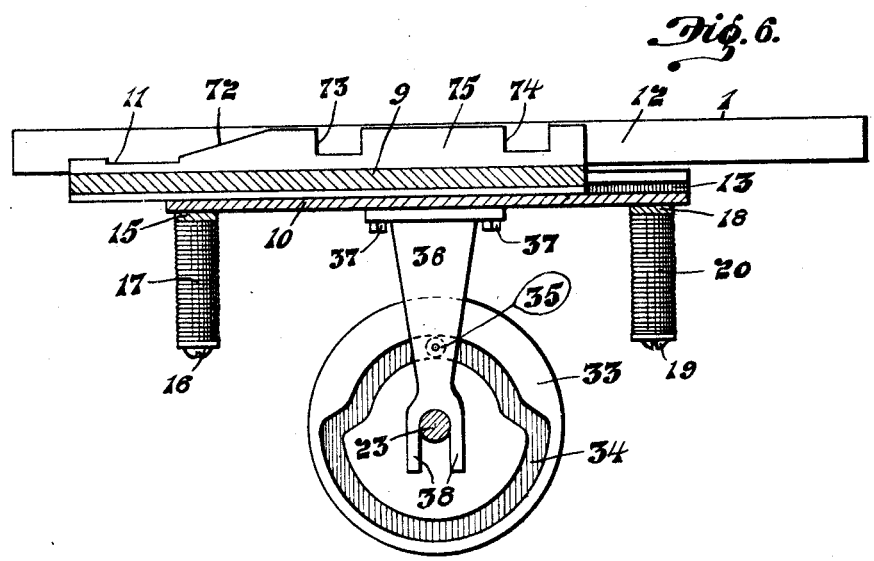

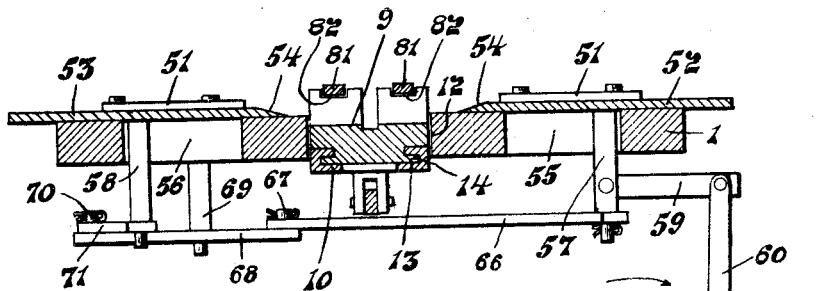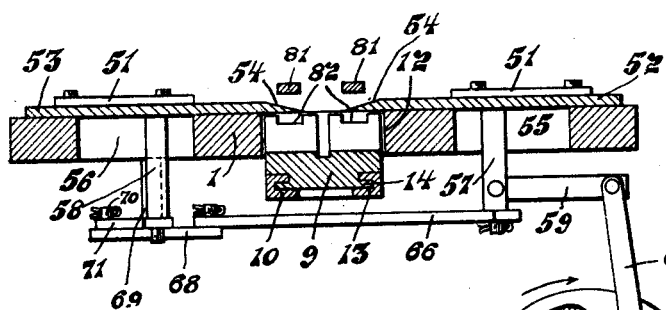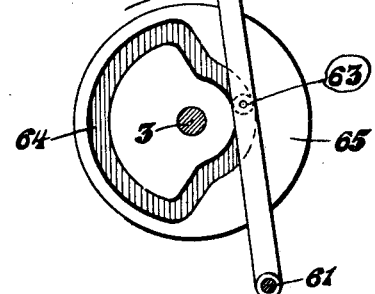

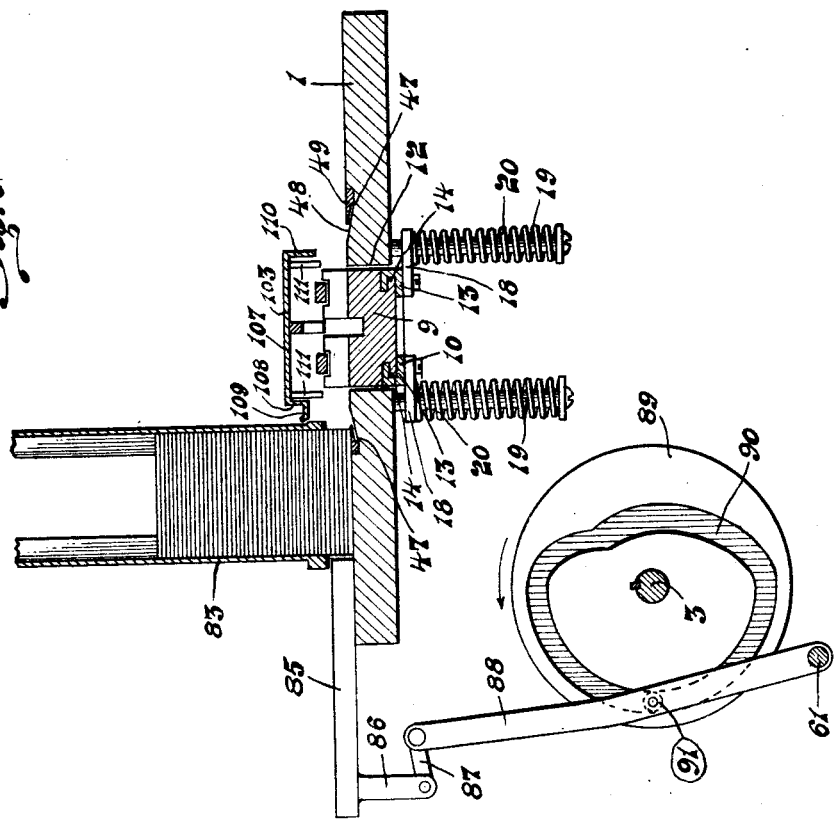

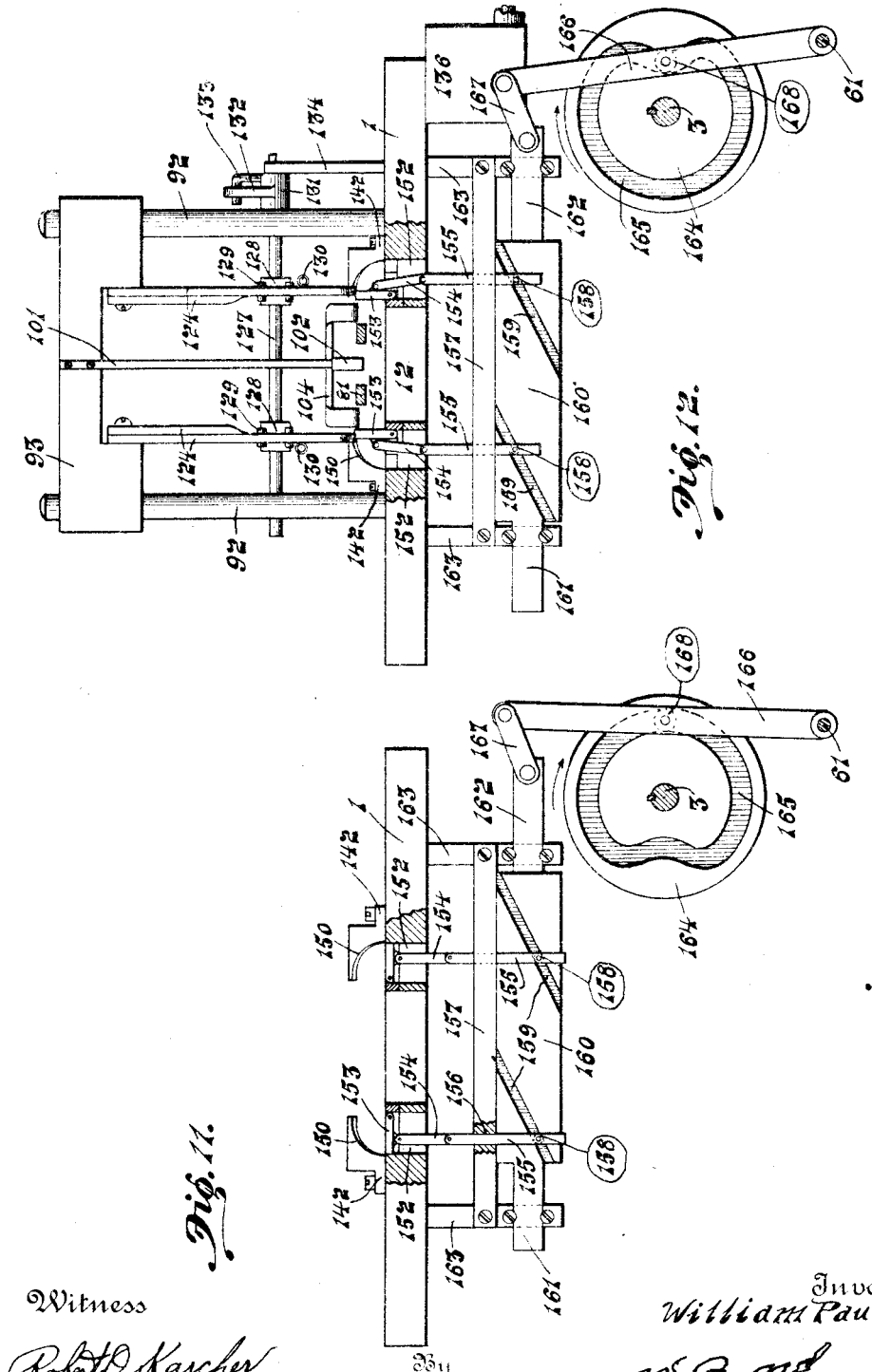

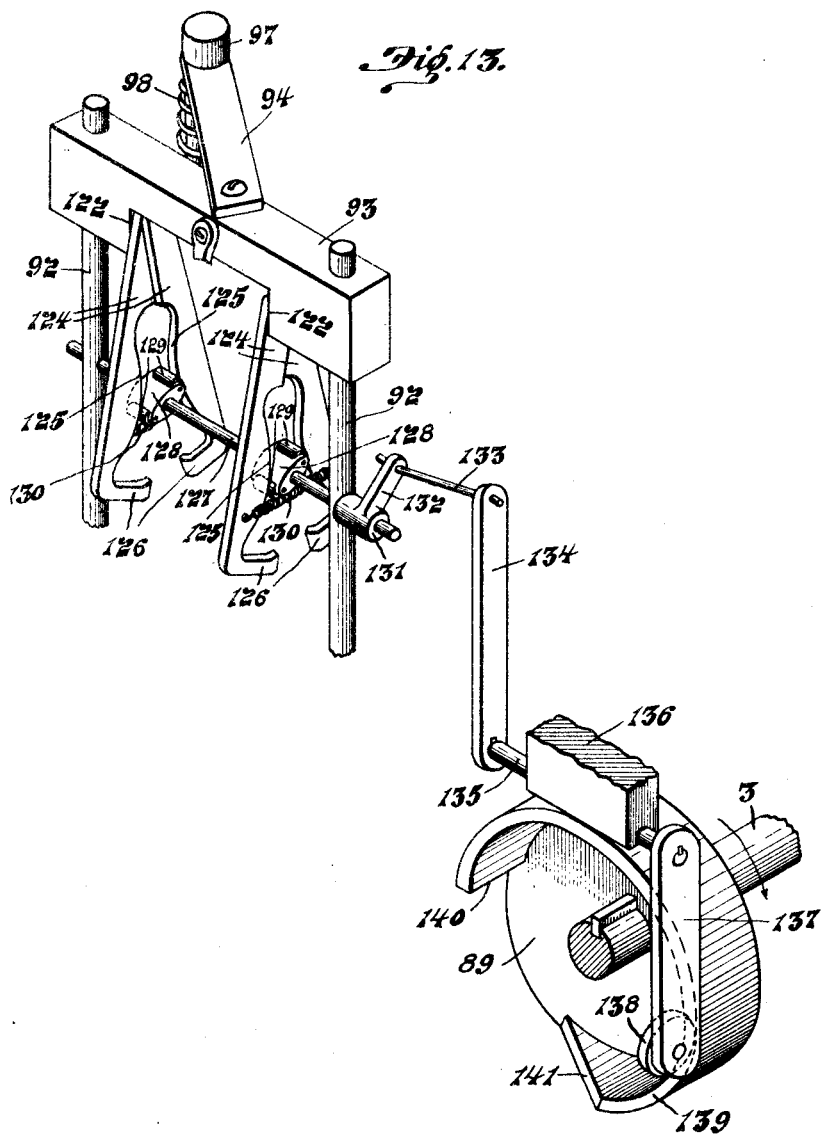

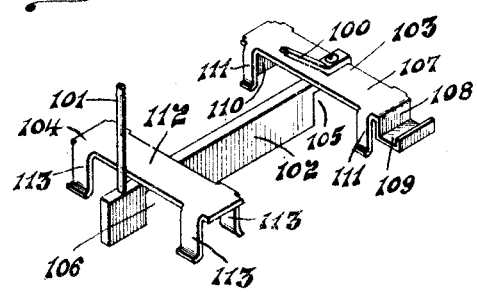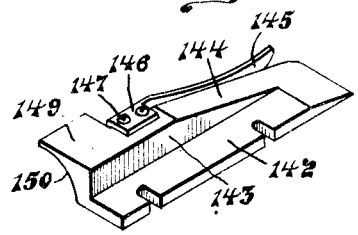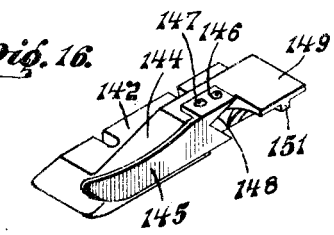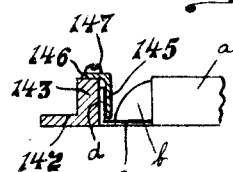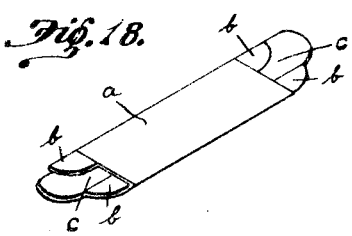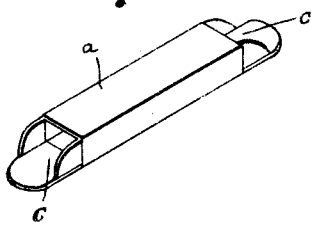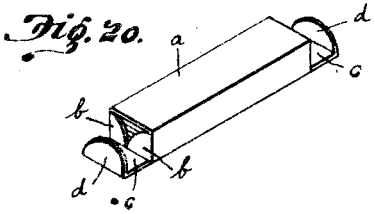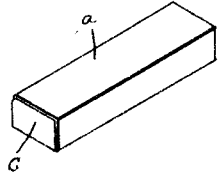

WILLIAM PAUL BOWER, OF SALEM, OHIO.

CARTONING-MACHINE.

1,177,169.

Specification of Letters Patent. Patented Mar. 28, 1916.

Application filed August 24, 1915. Serial No. 47,067.

*To all whom it may concern:*

Be it known that I, WILLIAM PAUL BOWER, a subject of the King of England, residing at Salem, in the county of Columbiana and State of Ohio, have invented a new and useful Cartoning-Machine; of which the following is a specification.

My invention relates to improvements in machines for cartoning small articles such as sticks of chewing gum or the like in packets; and the object is to provide a machine of generally improved construction for the purpose, which shall be automatic in its operation, whereby the articles to be cartoned are fed into the machine, assembled in desired numbers, placed in the cartons, and discharged from the machine, and the cartoning operation performed with great rapidity and accuracy in the stages of the progress of the articles through the machine.

The machine illustrated in the drawings is more especially designed for cartoning sticks or bars of chewing gum, the sticks or bars being of thin, flat, rectangular form. The cartons as illustrated in Figure 18 are placed in the flat or folded form in a reservoir and are fed to the machine by gravity being carried forward by a feeding mechanism and opened as shown in Fig. 19. The sticks or bars of gum are carried in another reservoir and are fed to the machine by gravity and as the carton assumes the open position above described the proper number of sticks or bars of gum are carried forwardly by an ejector plate and pushed into the carton which is carried through the machine, closed and ejected from the machine as will be hereinafter described. The carton thus packed consists of the desired number of sticks or bars of gum put up in the usual manner.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawings: Fig. 1 is a side elevation of my improved machine. Fig. 2 is a similar view from the opposite side. Fig. 3 is a top plan view of the machine. Fig. 4 is a section on the line 4—4, Fig. 3. Fig. 5 is a section on the line 5—5, Fig. 3. Fig. 6 is a longitudinal section showing the mechanism for raising and lowering the guide plate. Fig. 7 is a section on line 7—7, Fig. 3. Fig. 8 is a similar view showing the parts in the operative position. Fig. 9 is a section on line 9—9, Fig. 3. Fig. 10 is a similar view showing the parts in the operative position, the ejector plate being shown in the act of placing the desired number of bars of gum within a carton. Fig. 11 is a section on the line 11—11, Fig. 3. Fig. 12 is a similar view showing the parts in operative position. Fig. 13 is a perspective view showing the mechanism for closing the side flaps. Fig. 14 is a detail perspective view of the clamping frames. Fig. 15 is a detail perspective view of a portion of the device which creases and folds the flaps. Fig. 16 is a detail perspective view of the same from the opposite side. Fig. 17 is a detail sectional view through the same. Figs. 18, 19, 20 and 21 are perspective views of the carton showing the different operations through which it passes.

Similar numerals of reference indicate corresponding parts throughout the several figures of the drawings.

Referring more especially to the construction illustrated in the accompanying drawings, the numeral 1 indicates the bed plate of the machine which is supported upon suitable standards 2. Journaled in suitable bearings carried upon two of the standards is the main drive shaft 3 of the machine upon which is fixedly mounted the usual hand wheel 4 by means of which the shaft may be rotated by hand whenever an article becomes caught in the mechanism which occasionally happens in machines of this character. The power pulley 5 is loosely mounted upon the shaft 3 and is arranged to operate said shaft by means of the clutch 6, which is operated in the usual manner, a lever 7 being provided for this purpose.

A reservoir composed of two channel shaped uprights 8 is located near one extremity of the bed plate or table of the machine and the cartons, in the folded position as shown in Fig. 18 are placed in said reservoir a weight being placed upon the top of said cartons if necessary. Located through the longitudinal center of the bed plate is the feed bar 9, which is slidably mounted for longitudinal reciprocation in the vertically movable guide plate 10, said feed bar being provided at one extremity with a recess 11 arranged to pass beneath the carton reservoir and pick up at each operation the lowermost carton in said reservoir and carry said carton forward in the machine as will be hereinafter described.

The guide plate 10 is slidably mounted for vertical movement within the longitudinal slot 12 in the bed plate and is provided with the guide ways 13 within which are slidably mounted the flanges 14 of the feed bar. A flat plate or bar 15 is connected to the under surface of the guide plate 10 at one extremity thereof, said plate extending for a distance beyond either edge of the guide plate and provided with suitable apertures, by means of which it is slidably mounted upon the posts 16 which depend downwardly from the under side of the bed plate. Each of the posts 16 is provided at its lower extremity with an enlarged head, and between said head and the bar or plate 15 is interposed a compression spring 17. A pair of short bars 18 are located one upon each side at the opposite extremity of the guide plate, said bars serving to support the other extremity of the guide plate in the same manner as the bar 15. Each of the bars 18 is slidably mounted upon a post 19, a spring 20 being interposed between the enlarged head of said post and the bar 18.

A beveled gear 21 is mounted upon the shaft 3 and meshes with a similar beveled gear 22 mounted upon one extremity of the shaft 23, said shaft being journaled in suitable bearings 24 and 25 in the brackets 26 and 27 respectively, which brackets are supported from the bed plate and are provided with the angular extensions 28 and 29 respectively, upon the lower extremities of which are located the bearings 30 and 31 within which bearings is mounted the shaft 32.

A disk 33 is fixedly mounted upon the shaft 23, said disk being provided upon its inner face with a cam track 34 arranged to receive the roller 35 which is carried by the arm 36, said arm being rigidly secured to the guide plate 10 by means of the bolts or their equivalents 37. The lower portion of the arm 36 is bifurcated, the arms 38 being located upon either side of the shaft 23 as best shown in Fig. 6, serving to guide the movement of the arm 36 as said arm is reciprocated vertically by means of the cam and the roller above described.

Mounted upon the shaft 32 is a rock arm 39 to the extremity of which is rigidly attached the upwardly disposed arm 40, a link 41 connecting the upper extremity of said last named arm with the bifurcated bracket 42 which bracket is rigidly connected to the feed bar 9 and depends downwardly through the longitudinal slot 43 in the guide plate 10. A disk 44 is mounted upon the shaft 23 and provided with a cam track 45 which receives the roller 46 carried intermediate the extremities of the arm 46. As the disk 44 is rotated the feed bar 9 will be reciprocated within the guide plate 9.

A pair of longitudinal grooves 47 are provided in the upper face of the bed plate, one of said grooves being located upon each side of the feed bar, said grooves terminating adjacent a point at the bottom of the carton reservoir 8. The inner edge of each groove is tapered as indicated at 48 and a guide bar 49 is seated within each groove by means of screws 50, the lower beveled edge of each guide bar being spaced away from the inclined face 49 of the accompanying groove, thus forming a guide way therebetween as best illustrated in Fig. 9 of the drawings.

Guide ways 51 are mounted transversely across the bed plate and upon each side of the feed bar and slidably mounted within said guide ways are the carton opening plungers 52 and 53, said plungers being beveled at their inner extremities as indicated at 54. Transverse slots 55 and 56 are formed in the bed plate beneath the plungers 52 and 53, respectively, the posts 57 and 58 which are rigidly connected to said plungers being slidably mounted within said slots. A link 59 is pivotally connected to the post 57 and to the upper extremity of the lever 60, the lower extremity of said lever being pivotally mounted upon the shaft 61 which is carried by the bearings 62, mounted upon the standards 2. A roller 63 is carried intermediate the extremities of the roller 60, said roller engaging the cam track 64 in the disk 65, said disk being fixed upon the shaft 3.

A link 66 is pivotally connected to the lower extremity of the post 57 and extends beneath the guide plate and feed bar and is pivotally connected at 67 to the lever 68, said lever being pivotally mounted upon the lower extremity of a post 69, which is rigidly mounted and depends downwardly from the bed plate. The other extremity of the lever 68 is pivotally connected at 70 to a short link 71, said link being pivotally connected to the lower extremity of the post 58. By means of this mechanism the plungers 52 and 53 will be reciprocated transversely of the bed plate, toward or away from each other in unison.

The feed bar 9 is provided with the inclined upper face 72 adjacent the recess 11 which receives the folded carton from the carton reservoir, the forward portion of the feed bar being of greater depth than the portion in which said recess is located. Transverse recesses 73 and 74 are provided in the feed bar at points adjacent the inclined face 72 and the forward end of the feed bar respectively. The recess 73 is for the purpose of receiving the carton and co-acting with the carton opening plungers in opening said carton and carries the opened carton forward to the point where the gum is inserted therein. The recess 74 receives the carton as it is filled with the bars of gum and carries the filled carton forward to the mechanism which closes the flaps upon the carton.

A central longitudinal groove 75 is formed through the feed bar, and mounted at the base of the carton reservoir 8 is a central guide plate 76 which is located in said groove. Similar guide plates 77 are located at each side of the feed bar, said guide plates being for the purpose of guiding the folded carton carried in the recess 11 as the feed bar moves forward. Transverse supporting bars 78 and 79 are carried above the feed bar in any suitable manner as by the posts 80, said supporting bars supporting the guide rails 81 which are received by the shallow longitudinal grooves 82 formed in the upper face of the feed bar.

A gum reservoir 83 is located at one side of the feed-bar, the sticks or bars of gum being placed therein transversely of the bed plate 1 and fed upon said bed plate by gravity. A guide way 84 is provided upon the bed plate at the outer edge of said reservoir and slidably mounted within said guide way and arranged to reciprocate through the lower portion of said gum reservoir is the ejector plate 85. A post 86 is provided at the outer extremity of said ejector plate and depends downwardly therefrom, a link 87 pivotally connecting said post with the lever 88, said lever being loosely mounted at its lower extremity upon the shaft 61. A disk 89 is mounted upon the drive shaft 3, said disk being provided with a cam track 90 within which the roller 91, mounted upon the lever 88 travels.

A pair of upright guide posts 92 are located upon the bed plate, beyond the gum reservoir, said guide posts being equally spaced from the longitudinal center of the bed plate. Slidably mounted upon the guide posts is the sliding head 93, an arm 94 projecting at an angle from said sliding head, the free extremity of said arm being mounted upon the reciprocating rod 95, said rod being provided with an enlarged head 97 at its upper extremity against which the arm 94 is held by means of the spring 98 interposed between said arm 94 and the upper edge of the tubular bearing 99 which is fixed upon the bed plate and through which the rod 95 is slidably mounted.

A brace rod 100 is connected to the rear face of the sliding head and depends downwardly and rearwardly therefrom, and a similar brace rod 101 is connected to the forward face of said sliding head and depends downwardly therefrom, said brace rods carrying at their lower extremities the plate 102. A carton clamping frame 103 is carried near the rear extremity of the plate 102 and a somewhat similar frame 104 is carried near the forward extremity of said plate, said frames being disposed transversely to said plate. The plate 102 is provided with recesses 105 and 106 located adjacent the frames 103 and 104 respectively, said recesses being for the purpose of receiving the cartons as will be hereinafter described.

The clamping frame 103 comprises the top plate 107 secured upon the upper edge of the plate 102 by means of screws or their equivalents, said top plate being provided at the end adjacent the gum reservoir with a short downwardly disposed flange 108 provided at its lower edge with an out-turned portion 109 beneath which the bars of gum are passed during the operation of filling the carton. At the opposite end of the plate 107 is a down-turned flange 110 of greater length than the flange 108 and arranged to act as a stop to limit the movement of the bars or sticks of gum as they are shoved into the carton by means of the ejector plate. A pair of downwardly disposed fingers 111 is located near each extremity of the plate 107, said fingers being adapted to pass down upon each side of the carton being filled and in close proximity to the side faces of the feed bar. The frame 104 comprises the top plate 112 which is mounted upon the upper edge of the plate 102 and is provided near each extremity with a pair of down-turned fingers 113 wider than the fingers 111, said fingers being arranged to pass down upon each side of the carton during the operation of folding the flaps upon the carton.

The shaft 23 is provided at a point near the opposite extremity from the pinion 22 with a disk 114, said disk being provided with a cam track 115 within which the roller 116 is arranged to travel, said rolled being mounted upon one extremity of the lever 117, which lever is pivoted at 118 upon a bracket 119 depending downwardly from the bed plate. The opposite extremity of the lever 117 is provided with a slot 120 through which is mounted the pin 121 carried upon the lower extremity of the reciprocating rod 95. Thus it will be seen that as the cam oscillates the lever 117 the rod 95 will be reciprocated, and through the arm 94 the sliding head 93 will be caused to reciprocate upon the guide posts 92.

The sliding head 93 is provided intermediate its extremities and upon its under side with a cut out portion forming shoulders 122 near either extremity of said head and pivoted as at 123 upon each of said shoulders is a pair of jaws 124. The jaws of each pair are provided upon their adjacent edges with the curved cam portions 125, the lower extremity of each jaw being provided with an inwardly disposed finger 126 arranged to contact with the inner flaps of the carton and fold said flaps as will be hereinafter described.

A shaft 127 is journaled through the guide posts 92 and is provided with a pair of cam members 128, elliptical in cross section, one of said cam members being located between each pair of jaws 124. An anti-friction roller 129 is mounted at each side of each of the cams 128, said rollers bearing against the curved surfaces 125 of the jaws, a coil spring 130 connecting each pair of jaws, preferably at a point beneath the shaft 127 holding the jaws at all times in contact with the rollers upon the cam members.

A collar 131 is fixed upon one extremity of the shaft 127 and provided with a rock arm 132 which is connected by means of the link 133 with the rock arm 134 fixedly mounted upon the shaft 135, said shaft being journaled in a suitable bearing 136 which depends downwardly from the bed plate. An arm 137 is fixed to the other extremity of the shaft 135 and provided upon its free end with a roller 138, said roller arranged to ride upon the edge of the annular flange 139, which is provided upon the forward face of the disk 89. A break is provided in the flange 139, one extremity of said flange being cut off abruptly as at 140 while the other extremity is tapered gradually toward the disk 89 as shown at 141. As the roller 138 rides upon the edge of the flange 139 the cam members 128 will be held in the position best illustrated in Fig. 13, but as the extremity 140 of the flange passes beneath the roller, the arm 137 will be rocked bringing the roller into contact with the face of the disk 89, the cam members 128 being rocked into a vertical position allowing the springs 130 to bring the jaws 124 together and the jaws will be held in this position until the roller passes up the incline 141, and on to the edge of the flange 139 again.

For the purpose of turning up the end portion of each of the closing flaps of the cartons a pair of blocks 142 are located upon the bed plate in alinement with the guide bars 49. As both of said blocks are identical in construction with the exception that they are made right and left it is only thought necessary to describe one of the blocks. Each block is provided along the edge toward the center of the bed plate with an up-standing rib 143, the rear portion of said rib and the block being beveled as shown at 144. A plate 145, the form of which is best illustrated in Fig. 16 is provided at its upper edge with an over-turned flange 146 which rests upon the top of the rib 143 and is connected thereto by means of screws 147. The free extremity of the plate 145 is tapered and provided with a rounded under edge as shown and the opposite extremity of said plate beneath the flange 146 is provided with a V-shaped notch 148. Each of the plates 145 is spaced away from the rib 143 as illustrated in Fig. 17 thus allowing room for the up-turned extremity of the flap to pass between said plate and rib. An off-set portion 149 is provided upon the forward extremity of each of the ribs 143, the under side of said extension being curved forming an arc of a circle as shown at 150, a rib 151 being provided through the center of said curved portion, said rib being eccentric thereto.

An aperture 152 is formed in the bed plate beneath each of the extensions 149 and pivotally mounted within each of said apertures and concentric with the arc 150 is a gate 153, arranged to be oscillated beneath said off-set extension as will be hereinafter described. Each gate is pivotally connected by means of a link 154 with a reciprocating rod 155 slidably mounted through a suitable aperture 156 within the stationary block 157, an anti-friction roller 158 being carried by each of the rods 155 and located within one of the inclined grooves 159 in the horizontally slidable block 160, said block being provided with the reduced extensions 161 and 162 which are slidably mounted within the bearing brackets 163, supported from the bed plate, said block 157 being also mounted upon said brackets.

A disk 164 is fixedly mounted upon the shaft 3, a cam track 165 being provided in the forward face of said disk. A lever 166 is pivotally mounted at its lower extremity upon the shaft 61, the upper extremity of said lever being pivotally connected by a link 167 to a reduced portion 162 of the sliding block 160. Intermediate the extremities of the lever 166 is mounted an anti-friction roller 168 which is received within the cam track 165 and arranged to travel therein as the disk 164 rotates. It will thus be seen that as the disk 164 is rotated the lever 166 will be oscillated, reciprocating the block 160 and as said block is reciprocated the rollers 158 will travel in the inclined slots 159 reciprocating the rods 155 and through the connection of the links 154 the gates 153 will be raised from the normal position shown in Fig. 11 to the position illustrated in Fig. 12. It will be noted that each of the gates is provided in its free edge with a centrally located slot 169 which is provided to accommodate the eccentric rib 151. When the carton has been brought into position to be acted upon by the mechanism just above described it will have assumed the position illustrated in Fig. 20 of the drawings and one of the end flaps c thereof will be received upon each of the gates which are at that time in the initial position shown in Fig. 11. As the gates are raised the flaps c will be bent upwardly, hinging at the point where said flaps emerge from the body portion of the carton, the up-turned ends d of said flaps riding upon the eccentric ribs 151, thus guiding said up-turned end portions of the flaps into the carton, between the upper wall of the carton and the inner flaps b thereof, the closed carton as illustrated in Fig. 21 being then ejected from the machine as will be hereinafter described.

A discharge platform 170 extends outwardly from the forward extremity of the bed plate in a position to receive the filled cartons as they are ejected from the machine. The discharge platform is provided along each edge with an outwardly curved up-standing side wall 171 between which the filled cartons are received as they are ejected from the machine. The forward extremity of the platform is curved downwardly and a curved guard 172 is provided on each side thereof for the purpose of guiding the cartons downwardly from said platform on to the endless conveyer belt 173, said belt passing over a pulley 174 mounted on a shaft 175 which is journaled in a bearing 176 supported upon the uprights 177 which uprights also support the curved guards 172. A pulley 178 is mounted upon the shaft 176 and connected by means of a belt 179 with the pulley 180, said pulley being mounted upon the shaft 181 upon which shaft is also mounted the relatively large pulley 182, said last named pulley being connected by means of the belt 183 with the drive pulley 184 which is fixedly mounted upon the shaft 23.

When it is desired to operate the machine, the clutch 6 is thrown into engagement with the pulley 5, rotating the main shaft 3 and through the beveled gears 21 and 22 operating the shaft 23, causing the several members of the machine to operate as above described. The cartons designated by the letter a, in the form shown in Fig. 18 are contained in the reservoir 8 and the bars or sticks of gum designated by the letter f are contained in the reservoir 83.

As the feed bar 9 assumes the position shown in Fig. 4 the lowermost carton in the carton reservoir is received into the recess 11 in said feed bar and as the feed bar is moved forwardly within the guide plate 10 by means of the cam disk 44 and the lever and link 40 and 41 respectively, the operation of which is above described, the carton thus picked up will be moved forwardly upon the bed plate 1, the end or closing flaps c of said carton sliding beneath the guide bars 49. As the carton is carried to a point adjacent the carton opening plungers 52 and 53 the cam disk 33 will have assumed the position shown in Fig. 6, the arm 36 being operated thereby and drawing the guide plate and feed bar into their lowermost position, leaving the cartons in alinement with the carton opening plungers 52 and 53 which plungers are then in the position shown in Fig. 7. The feed bar 9 will at the same time through the mechanism above described have been carried back to its extreme backward position, the transverse recess 73 in the feed bar being at this time located beneath the carton above referred to.

As the cam 65 assumes the position illustrated in Fig. 8, causing the plungers 52 and 53 to be moved into their operative position the cam disk 33 will have rotated, bringing the feed bar into its raised position, the plungers passing into each open end of the carton and slightly opening the carton as the feed bar is raised, the transverse recess 73 receiving the carton which is caused by this action to assume the form shown in Fig. 19. The feed bar which at this time will have reached the position shown in Fig. 4 will then be moved forward the open carton which is located in the transverse recess 73 being carried therewith to a point directly beneath the clamping frame 103. As the feed bar reaches this, the forward limit of its movement, it will, by means of the guide plate, be lowered, releasing the empty carton at the same time that the sliding head 93 will be lowered by means of the cam 114 as above described, the frame 103 being carried downwardly by means of said sliding head and clamping the empty carton upon the bed plate. The ejector plate 85 will then be operated by means of the cam 89 sliding the five lowermost bars of gum from the reservoir 83 into the open carton, the end flange 110 of the clamping frame preventing the sticks of gum from being passed beyond the other open end of the carton. This operation is illustrated in Fig. 10.

The guide plate 10 being in the lowered position, the feed bar 9 will have moved back to the limit of its backward movement at which time the transverse recess 74 therein will have reached a position directly beneath the clamping frame 103 containing the carton which has just been filled. As the sliding head 93 is raised in the manner heretofore described, carrying therewith the clamping frame 103 and releasing the filled carton the guide plate will be raised carrying the feed bar therewith, said carton being received in the transverse recess 74. Upon the next forward movement of the feed bar which still remains in the raised position, the carton will be carried forward upon the bed plate, the extremities of the closing flaps c being received between the ribs 143 and the plates 145. As the closing flaps are thus passed between the ribs and plates above named the extremities of the flaps are turned upwardly as indicated at d in Fig. 20. The feed bar will reach the limit of its forward movement bringing the carton to rest beneath the clamping frame 104 and as the feed bar is lowered, releasing the carton, the sliding head 93 will at the same time be lowered, the clamping frame 104 engaging the carton. After the extremity 140 of the cam track 139 passes beneath the roller 138 the arm 137 will be rocked, the cam members 128 being rocked into a vertical position as above described, the jaws 124 being drawn together by means of the coil springs. As the jaws 124 are closed the fingers 126 thereon will engage the inner flaps $b$ of the carton folding said flaps inwardly, the carton then appearing as shown in Fig. 20. As the inclined portion 141 of the cam flange 139 passes beneath the roller 138 the roller will be caused to ride up on the edge 139 rocking the arm 137 into the normal position, causing the jaws 124 to be opened as shown in Fig. 13. The end or closing flaps $c$ are at this time resting upon the gates 153 and as the block 160 is moved into the position shown in Fig. 12 the rods 155 will be raised by means of the inclined tracks 159 thus raising the gates and closing the end flaps $c$, the carton then appearing as indicated in Fig. 21. The sliding head 93 at this point, will raise, causing the frame 104 to release the filled and sealed carton and as the feed bar 9 is carried forward in its next operation the buttons 185 upon the forward end of the feed bar will engage the carton moving it forward to the discharge platform. Upon each forward movement of the feed bar a folded carton is carried from the carton reservoir to the carton opening plungers, an opened carton is carried, in the recess 73 from the plungers to the clamping frame 103 preparatory to being filled, the latest filled carton is carried in the recess 74 from the gum reservoir to the clamping frame 104, where the flaps are closed as above described and the preceding carton is moved toward the discharge platform by means of the buttons 185. The finished articles are thus one at a time dropped from the discharge platform on to the endless carrier belt 173 and carried away from the machine.

I claim:—

1. In a cartoning machine, the combination of a carton reservoir, carton opening plungers, an article reservoir, an ejector plate connected therewith, flap-closing jaws and gates, and feed mechanism for intermittently engaging and advancing a carton through the machine.

2. A cartoning machine comprising a carton reservoir, carton opening plungers, an article reservoir, an ejector plate connected therewith, inner flap-folding jaws, outer flap-folding gates, and feed mechanism for intermittently engaging and advancing a carton through the machine, comprising a reciprocating feed bar provided with a plurality of transverse recesses arranged to receive the cartons.

3. A cartoning machine of the character described comprising a carton reservoir adapted to contain collapsed cartons, carton opening plungers, an article reservoir, an ejector plate connected therewith, means for closing inner flaps upon the carton, means for forming upturned ends upon outer flaps upon each carton, means for folding outer flaps upon the inner flaps and pushing the upturned ends of the outer flaps within the body of the carton and means for intermittently advancing a carton through the machine.

4. In a cartoning machine of the character described, the combination with the drive shaft of feed mechanism for intermittently engaging and advancing the cartons through the machine, comprising a vertically reciprocal guide plate actuated from the drive shaft and a feed bar horizontally reciprocal upon said guide plate and actuated from said shaft, said feed bar provided with transverse recesses arranged to receive the cartons.

5. A cartoning machine of the character described comprising a carton reservoir, carton opening plungers, an article reservoir, an ejector plate connected therewith, flap-folding mechanism, and feed mechanism for intermittently engaging and advancing the cartons from each of said mechanisms to the next succeeding mechanism, said feed mechanism comprising a vertically reciprocal guide plate, and a feed bar horizontally reciprocal upon said guide plate, said feed bar provided at intervals with transverse recesses arranged to receive the cartons.

6. In a cartoning machine of the character described, the combination with a drive shaft of feed mechanism for intermittently engaging and advancing the cartons through the machine, comprising a vertically reciprocal guide plate, an arm connected to said guide plate, a cam mounted upon said shaft and engaging said arm for the purpose of raising and lowering said guide plate, a feed bar horizontally slidably mounted upon said guide plate, a second cam mounted upon said shaft and means connecting said last named cam with said feed bar for the purpose of reciprocating said feed bar, said feed bar being provided with carton receiving recesses.

7. In a cartoning machine of the character described, the combination with the driving mechanism, of feed mechanism for guiding and advancing a carton intermittently through the machine, carton opening mechanism along the path of the carton, carton filling mechanism arranged to fill the carton with a predetermined number of articles, folding mechanism arranged to fold and close the flaps upon the carton and discharge mechanism operating when the carton is filled and closed to expel the carton from the machine, all of said parts actuated by said driving mechanism.

8. In a cartoning machine, the combination of a carton reservoir, carton opening plungers, an article reservoir, an ejector plate connected therewith, flap-folding mechanism and feed mechanism for intermittently engaging and advancing the cartons through the machine, said feed mechanism comprising in combination a drive shaft, a vertically reciprocal guide plate, an arm connected to said guide plate, a cam mounted upon said shaft and engaging said arm for the purpose of raising and lowering said guide plate, a feed bar horizontally slidably mounted upon said guide plate, a second cam mounted upon said shaft, and means connecting said last named cam with said feed bar for the purpose of reciprocating said feed bar, said feed bar being provided with carton receiving recesses.

9. A cartoning machine comprising a carton reservoir, carton opening plungers, an article reservoir, an ejector plate connected therewith, flap-folding mechanism, and feed mechanism for intermittently engaging and advancing a carton through the machine, comprising a vertically and horizontally reciprocating feed bar provided with a plurality of transverse recesses arranged to receive the carton.

10. A cartoning machine comprising a carton reservoir, carton opening plungers, an article reservoir, an ejector plate connected therewith, inner flap closing jaws, outer flap folding means, outer flap closing gates, and feed mechanism for intermittently engaging and advancing a carton through the machine, comprising a reciprocating feed bar provided with a plurality of transverse recesses arranged to receive the cartons.

11. A cartoning machine comprising a carton reservoir, carton opening plungers, an article reservoir, an ejector plate connected therewith and adapted to place the desired number of articles in the opened carton, a clamping frame adapted to hold the carton during the filling operation, flap closing jaws and gates, a second clamping frame adapted to hold the carton during the flap closing operation and feed mechanism for intermittently engaging and advancing a carton through the machine.

12. A cartoning machine comprising a carton reservoir, carton opening plungers located beyond said carton reservoir, means for reciprocating said plungers toward and away from each other, a gum reservoir, an ejector plate slidably mounted in said gum reservoir, means for reciprocating said ejector plate, flap folding mechanism located beyond said gum reservoir and feed mechanism for intermittently engaging and advancing a carton through the machine, comprising a vertically and horizontally reciprocal feed bar provided with a series of transverse recesses arranged to receive the cartons.

13. In a cartoning machine of the character described, the combination of a bed plate provided with a longitudinal slot and supported upon suitable standards, a drive shaft located adjacent said bed plate, a second shaft located at right angles to said drive shaft and arranged to be driven by said drive shaft, a carton reservoir located near one extremity of said bed plate, a pair of carton opening plungers located beyond said reservoir, one of said plungers being located upon each side of the slot in said bed plate, a cam wheel mounted upon said drive shaft, means operated by said cam wheel for reciprocating said plungers toward or away from each other, a gum reservoir located adjacent said slot and beyond said plungers, an ejector plate slidably mounted within said gum reservoir, a second cam wheel mounted upon said driving shaft, means operated by said last named cam wheel for reciprocating said ejector plate, flap-folding jaws mounted above said bed plate and beyond said gum reservoir, means operated by said last named cam wheel for operating said folding jaws, a flap-folding gate mounted in said bed plate upon each side of said slot, means operated from said driving shaft for operating said gates, a feed bar mounted for longitudinal reciprocation within the slot in said bed plate and means operated by said second named shaft for reciprocating said feed bar.

14. In a cartoning machine of the character described, the combination of a bed plate provided with a longitudinal slot and supported upon suitable standards, a drive shaft located adjacent said bed plate, a second shaft located at right angles to said drive shaft and arranged to be driven by said drive shaft, a carton reservoir located near one extremity of said bed plate, a pair of carton opening plungers located beyond said reservoir, one of said plungers being located on each side of the slot in said bed plate, a cam wheel mounted upon said drive shaft, means operated by said cam wheel for reciprocating said plungers toward or away from each other, a gum reservoir located adjacent said slot and beyond said plungers, an ejector plate slidably mounted within said gum reservoir, a second cam wheel mounted upon said driving shaft, means operated by said last named cam wheel for reciprocating said ejector plate, flap-folding jaws mounted above said bed plate and beyond said gum reservoir, means operated by said last named cam wheel for operating said folding jaws, a flap-folding gate mounted in said bed plate upon each side of said slot, means operated from said driving shaft for operating said gates, a guide plate mounted for vertical reciprocation within the slot in said bed plate, means operated by said second named shaft for vertically reciprocating said guide plate, a feed bar mounted for horizontal reciprocation with said guide plate and means operated by said second named shaft for reciprocating said feed bar.

15. In a cartoning machine of the character described, the combination of a bed plate provided with a longitudinal slot and supported upon suitable standards, a drive shaft mounted adjacent said bed plate, a second shaft located at right angles to said drive shaft and arranged to be driven by said drive shaft, a carton reservoir located upon one extremity of said bed plate, a pair of carton opening plungers located near said reservoir, one of said plungers located on each side of the slot in said bed plate, a cam wheel mounted upon said drive shaft, means operated by said cam wheel for reciprocating said plungers toward or away from each other, a gum reservoir located adjacent said slot and beyond said plungers, an ejector plate slidably mounted within said gum reservoir, a second cam wheel mounted upon said drive shaft, means operated by said last named cam wheel for reciprocating said ejector plate, uprights mounted upon said bed plate beyond said gum reservoir, a sliding head mounted upon said uprights, a clamping frame carried by said sliding head, folding jaws carried by said sliding head, means operated by said second named shaft for intermittently reciprocating said sliding head, a flap-folding gate mounted in said bed plate upon each side of said slot, means operated from said drive shaft for operating said gates, a feed bar mounted for longitudinal vertical reciprocation within the slot in said bed plate and means operated by said second named shaft for reciprocating said feed bar.

In testimony that I claim the above, I have hereunto subscribed my name.

WILLIAM PAUL BOWER.